United States Patent [19]

Chisholm

[11] 4,330,106
[45] May 18, 1982

[54] GUARD RAIL CONSTRUCTION
[76] Inventor: Douglas B. Chisholm, 1906 Memory Ct., Vienna, Va. 22180
[21] Appl. No.: 35,297
[22] Filed: May 2, 1979
[51] Int. Cl.³ .............................................. E01F 15/00
[52] U.S. Cl. ...................................... 256/13.1; 256/19
[58] Field of Search ..................... 256/13.1, 19; 403/2; 248/66

[56] References Cited

U.S. PATENT DOCUMENTS

| | | | |
|---|---|---|---|
| 2,025,014 | 12/1935 | Brickman et al. | 256/13.1 |
| 2,085,098 | 6/1937 | Height et al. | 256/13.1 |
| 2,101,176 | 12/1937 | Height | 256/13.1 |
| 2,180,286 | 11/1939 | Roemer | 256/13.1 |
| 2,536,760 | 1/1951 | Martin et al. | 256/13.1 |
| 2,776,116 | 1/1957 | Brickman | 256/13.1 |
| 3,966,173 | 6/1976 | Glaesener | 256/13.1 |
| 4,071,970 | 2/1978 | Strizki | 403/2 X |

FOREIGN PATENT DOCUMENTS 1534526 5/1969 Fed. Rep. of Germany ..... 256/13.1

OTHER PUBLICATIONS

"Guide for Selecting, Locating and Designing Traffic Barriers", vol. 1 Guidelines, Feb. 1976, FHWA-RD-76-503, pp. 64 & 65.

Primary Examiner—Andrew V. Kundrat
Attorney, Agent, or Firm—Cushman, Darby & Cushman

[57] ABSTRACT

A guard rail system including a number of W-beam rail elements with a rail end mounted to one of the elements. A number of vertical posts are provided for supporting the rail elements in substantially horizontal position, the four posts closest to the rail end being mounted to break away upon an axial impact. The rail elements are attached to each other in overlapping relationship so that they will move axially with respect to each other upon an axial impact, but will maintain full tensile strength, and thus their re-directional characteristics, upon other than axial impacts, by a plurality of first bolts received by openings in the rail elements. Each opening is bordered on one end thereof by a tang formed in the rail element. Second, frangible bolts attach the rail elements to the posts. The guard rail system prevents spearing, as well as absorbing the energy of the impact.

29 Claims, 7 Drawing Figures

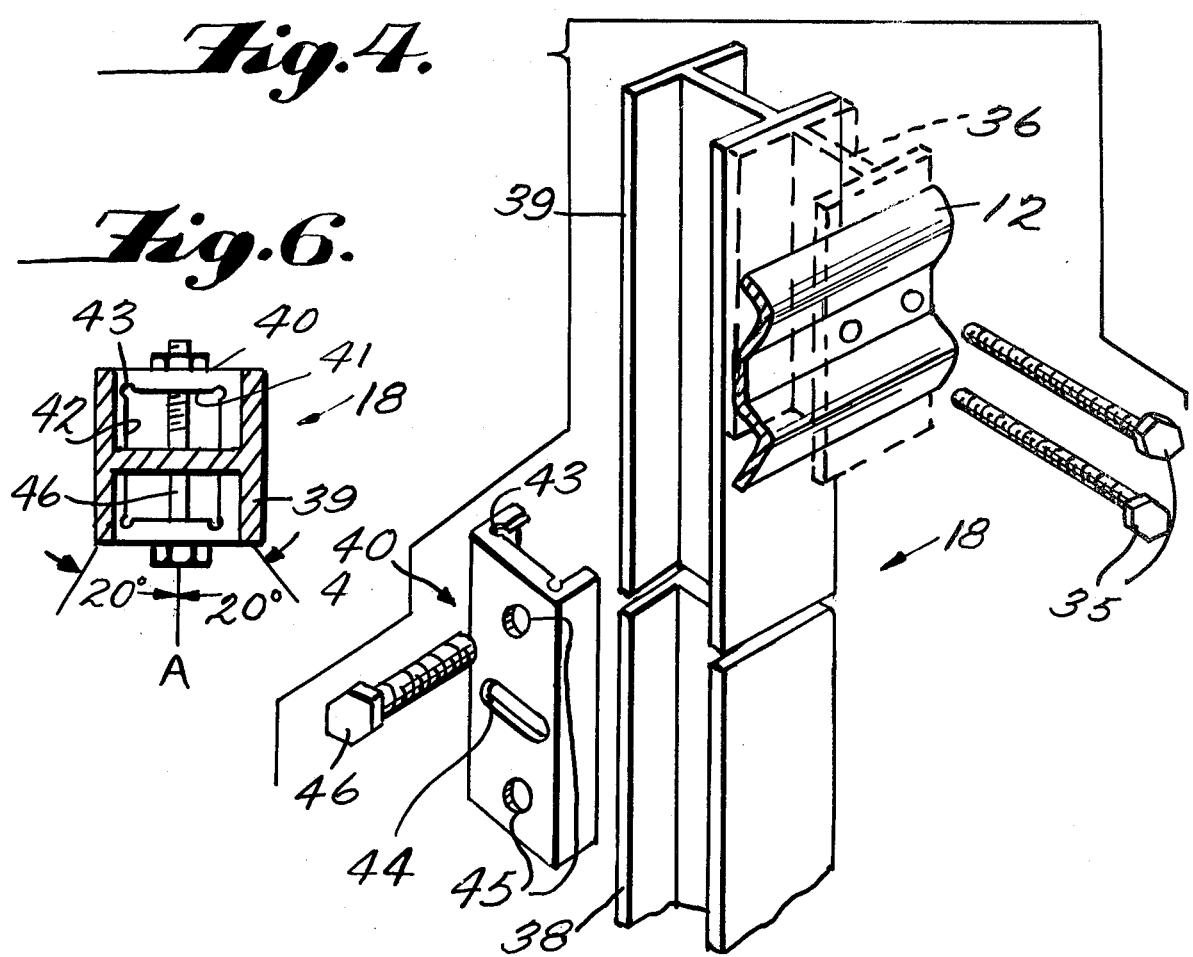
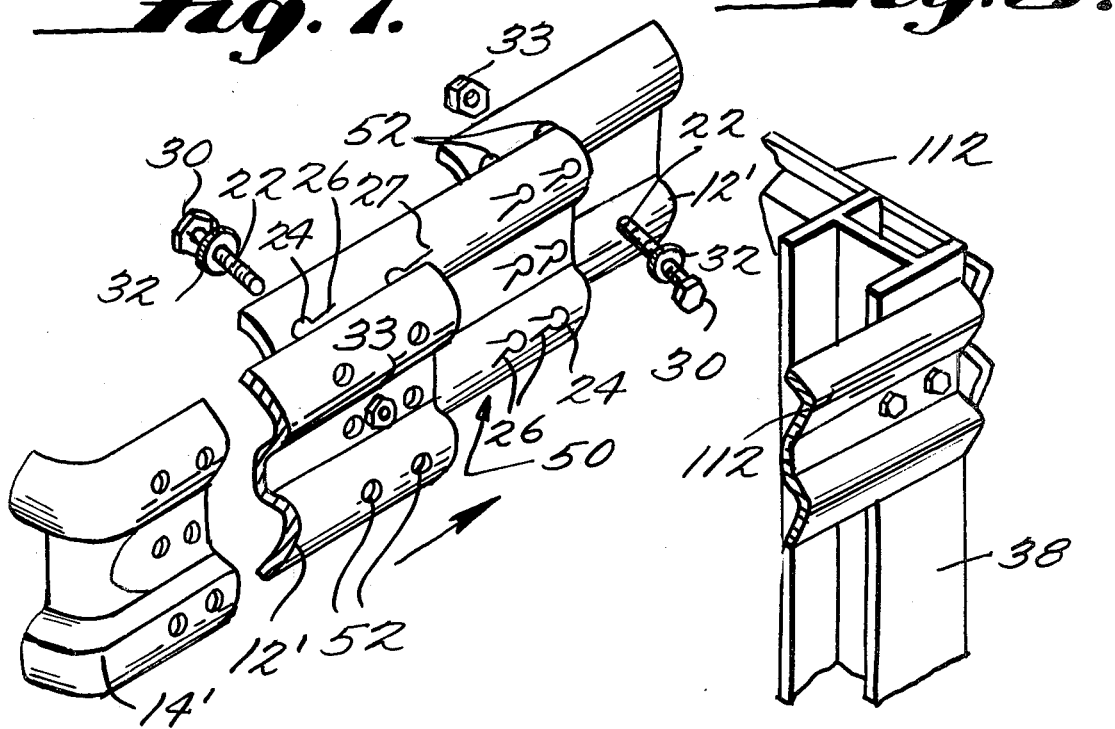

GUARD RAIL CONSTRUCTION

BACKGROUND AND SUMMARY OF THE INVENTION

Untreated ends of road side barriers can be extremely hazardous if impacted since the beam of the system tends to penetrate the passager compartment (spearing) and will generally stop the vehicle abruptly. Therefore, federal regulations require a crashworthy end treatment for guard rail systems. Such end treatments must be capable of eliminating spearing and vaulting problems while maintaining full tensile strength for impacts other than axial impacts, so that the guard rail system can perform its normal vehicle redirection functions. It is also desirable that such end treatments be capable of absorbing energy of the impact.

Conventional end treatments include Energite sand-filled barrels, the GREAT system, and breakaway cable terminals. While such systems are generally acceptable for performing their desired end function, they are relatively expensive, their expense limiting their applicability in many situations. While the breakaway cable terminal system is not quite as expensive, such a system does not have good energy absorption characteristics.

The guard rail system according to the present invention is effective to prevent spearing, vaulting, or rolling of a vehicle upon axial impact of the guard rail system, yet will maintain full tensile strength for other than axial impacts, and thus provides the desired vehicle re-directional characteristics for such other impacts. The system according to the present invention also has energy absorption characteristics, and is less expensive than competing prior art systems.

The guard rail system according to the present invention includes a plurality of rail elements having characteristics for redirecting impacting vehicles (e.g. standard W-beam guard rails). A rail end is mounted to one of the rail elements and forms a termination of the plurality of rail elements. A plurality of vertical posts are provided for supporting the rail elements in a substantially horizontal position, and means are provided for mounting at least the post closest to the rail end (and preferably the four end posts) so that said post will break away upon an axial impact of the rail end but will not fail upon impact in other directions. Means are also provided for attaching the rail elements to each other in overlapping relationship so that the rail elements will move axially with respect to each other in the axial direction upon an axial impact, but will maintain full tensile strength for maintaining their re-directional characteristics upon other than axial impacts, said means comprising first bolt means and surface means of said rail elements for receiving said first bolt means. Second bolt means are also provided for attaching the rail elements to the posts. The second bolt means preferably comprise a plurality of frangible bolts for connecting the rail elements to the posts so that the rail elements will break away from the posts upon an axial impact on the rail ends but will not break away upon other than axial impacts.

The rail elements extend from the rail end in the direction of travel of vehicles along a highway with which the system is associated, and the overlapping of the rail elements is accomplished by disposing the rail element closer to the rail end of overlapping rail elements on top. The surface means of the rail elements comprises, for each bolt, a bolt receiving opening and a tang of the rail element having a root portion located closer to the rail end than the opening, and extending from the root portion to the bolt opening. The tang may be wider at its root portion than it is adjacent its respective bolt opening to allow the bolt washer to pull through on axial impacts.

Any suitable conventional arrangement may be provided for mounting the posts adjacent the rail ends so that they will break away upon an axial impact. One preferred such arrangement comprises first and second distinct post sections and coupling means for attaching the post sections together, the coupling means being those such as disclosed in copending application Ser. No. 898,892 filed Apr. 21, 1978, the disclosure of which is hereby incorporated by reference herein.

According to the invention, every other rail element may be formed with the surface means. Such rail element can be provided as inserts which may be retrofitted to conventional guard rails, and the invention is also directed to such inserts per se.

It is the primary object of the present invention to provide an effective, inexpensive, broadly applicable crashworthy end treatment for a road side barrier; and suitable rail elements therefor. This and other objects of the invention will become clear from an inspection of the detailed description of the invention, and from the appended claims.

BRIEF DESCRIPTION OF THE DRAWINGS

FIG. 4 is a perspective view illustrating the interconnection between two post sections adjacent the guard rail system end;

FIG. 5 is a perspective view illustrating an anchor for a post underground section;

FIG. 6 is a top sectional view showing the structure of FIG. 4; and

FIG. 7 is an exploded view showing the assembly of two conventional guard rail elements with an insert according to the present invention.

DETAILED DESCRIPTION OF THE DRAWINGS

Figure 1:
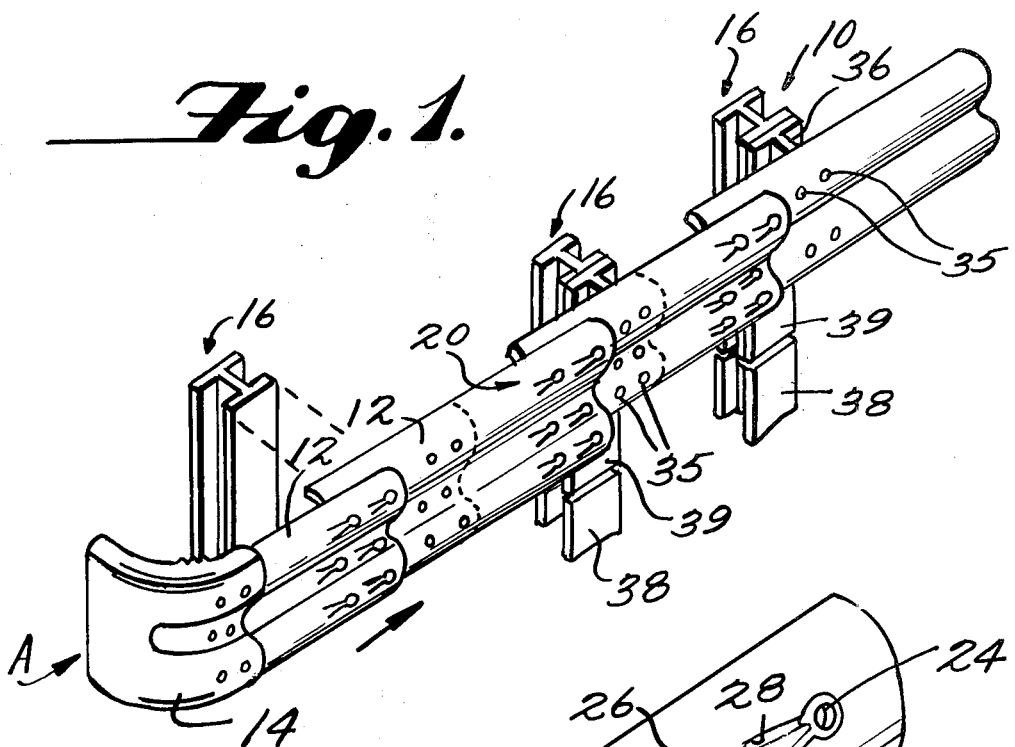
FIG. 1 is a perspective of an exemplary guard rail system according to the present invention in assembled condition.

An exemplary guard rail system according to the present invention, providing a crashworthy end treatment of a conventional road side barrier, is illustrated generally at 10 in FIG. 1. The system includes a plurality of conventional rail elements 12, such as standard W-beam guard rails, for redirecting impacting vehicles. A curved rail end 14 is mounted to one of the rail elements 12 and provides a termination of the guard rail system. A plurality of vertical posts 16 are provided for supporting the rail elements 12 in a substantially horizontal position, and means 18 (see FIGS. 4 and 5) are provided for mounting at least the post 16 closest to the rail end 14 so that that post will break away upon an axial impact (in direction A) of the rail end 14, but will not fail upon an impact in other directions. Preferably, the four posts 16 closest to the rail end 14 are so mounted.

Figure 2:
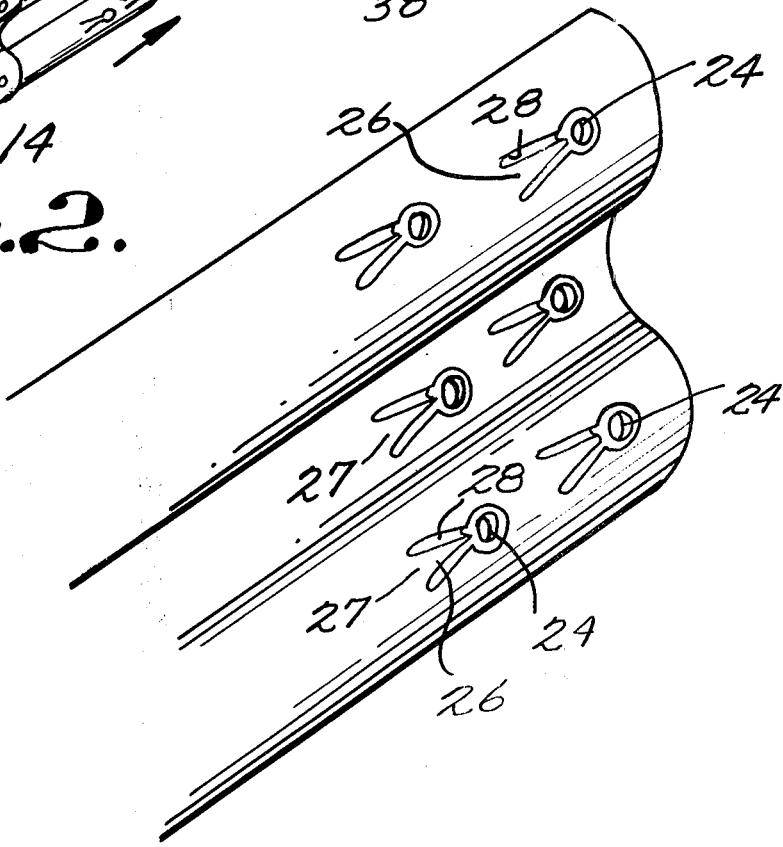
FIG. 2 is a detailed view of exemplary surface means for receipt of bolts attaching or overlapping guard rail elements together.
Figure 3:
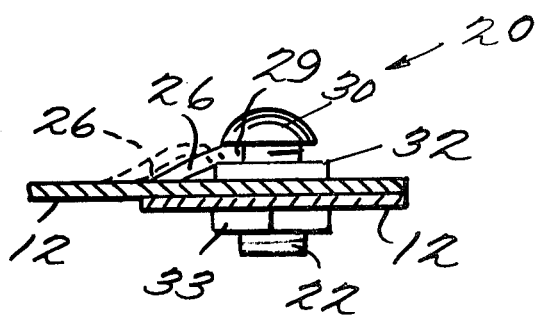
FIG. 3 is a detailed sectional view illustrating an exemplary first bolt connecting overlapping guard rail elements together.

Means, illustrated generally at 20 in FIGS. 1 and 3, are provided for attaching the rail elements 12 to each other in overlapping relationship so that they will move axially with respect to each other upon an impact in direction A, but will maintain full tensile strength for maintaining their redirectional characteristics upon other than axial impacts. Such attaching means include first bolt means, comprising a plurality of bolts 22 (see FIG. 3) and surface means of the rail elements 12 for receiving the bolts 22. The surface means include a bolt receiving opening 24 for each bolt 22, and a tang 26 of the rail element 12 having a root portion 27 located closer to the rail end 14 than the opening 24, and extending from the root portion 27 to the bolt opening 24, terminating in an end 29 (see FIG. 3). The tang 26 is cut out, or at least thinned, around its periphery (except for root portion 27) as illustrated at 28 in FIG. 2. The system according to the invention further comprises second bolt means, including a plurality of frangible bolts 35 (see FIGS. 1 and 4) for connecting the rail element 12 to the post 16 so that the rail elements will break away from the posts 16 upon an axial impact (A) on the rail end 14, but will not break away upon other than axial impacts.

As illustrated most clearly in FIG. 3, the first bolts 22 preferably connect the overlapping rail elements 12 together so that the end 29 of the tang 26 is received between the head 30 of the bolt and a washer 32, the head 30 and washer 32 being disposed on the opposite side of the rail elements 12 than the nut 33 for holding the bolt 22 in place. The rail elements extend from the rail end 14 in the direction of travel of vehicles along a highway with which the system is associated (the direction of travel being parallel to direction A) the overlapping of the rail elements being accomplished by disposing the rail element 12 closer to the rail end 14 of each set of overlapping rail elements on top, as indicated in FIG. 1. The top rail element 12 in FIG. 3 is thus closer to the rail end 14 than the bottom rail element 12. The tang ends 26 may be designed, as illustrated by the bottom tangs 26 in FIG. 2, so that they are wider at the root portion 27, tapering to the bolt opening 24. This allows the washer 32 to pull through upon axial impacts. Upon an axial impact, the rail elements 12 will move in the axial direction with respect to each other, the tangs 26 assuming the dotted line position of FIG. 3, and tearing will preferably occur six inches to a foot before being arrested, at which point the bolts 22 will be laterally displaced and ejected.

The mounting means 18 may take a wide variety of forms. For instance, the posts 16 may be formed of a material that will break away, such as wood, being thinner in the direction A than in the direction perpendicular thereto. The preferred arrangement for the mounting means 18, however, comprises forming the posts 16 as two metal sections, the first metal section 38 being an I-beam disposed in the ground and the second metal section 39 being an I-beam disposed above ground, with coupling means for mounting the sections 38, 39 together, the coupling means failing upon an axial impact A but not upon impacts in other directions. While the coupling means may take a variety of forms, for example such as shown in U.S. Pat. Nos. 3,820,906, 3,912,404, or 4,017,970, the coupling means preferably takes the form of a channel member 40 such as disclosed in copending application Ser. No. 898,982 filed Apr. 21, 1978, the disclosure of which is hereby incorporated by reference herein.

The channel member 40 includes a central face 41 and two opposite side portions 42 extending generally perpendicular to the central face 41. Means define at least one linear groove 43 in at least one of the central face 41 and side portions 42, the groove having an axis generally parallel to the side portions 42. Means defining a transverse through-extending opening 44 are provided in the central face adjacent at least one end of the groove 43 and provide substantially and end termination thereof, and means 45 for receipt of a fastening component (e.g. bolt 46) are formed in the central face 41 on each side of a plane passing through opening 44 perpendicular to the central face 41. Preferably two channel members 40 are provided disposed in each of the open channel shaped portions of the I-beams 38, 39, as illustrated most clearly in FIG. 6, with fastening bolts 46 being provided passing through both openings 45 of each channel member 40. The channel members 40 may face outwardly in the same direction as the channel-shaped openings of the I-beams 38, 39, or—in order to provide a greater bending moment capacity—may face inwardly as illustrated in FIGS. 4 and 6. The channel members 40 thus provide a breakaway action of the posts 16 with which they are associated upon an axial impact A (±20°, as indicated in FIG. 6), but will not allow breakaway upon impacts in other directions (besides direction A ±20°).

In order to stabilize the first sections 38 of the posts 16, W-beam guard rail sections 112 (see FIG. 5) may be mounted to the first metal sections 38 and disposed underground. This provides a simple, inexpensive way of positively stabilizing the posts 16.

A modified arrangement according to the present invention is illustrated in FIG. 7. In the FIG. 7 embodiment, the rail elements 12' are conventional rail elements having through bores 52 formed at the ends thereof. In this embodiment, an insert 50 is provided which has the surface means 24, 26 associated with both ends thereof, the root portions 27 of each tang 26 being located closer to the middle of the insert 50 and then the opening 24 with which they are associated. The insert 50 may be unconnected to the vertical posts 16, and the inserts 50 may be of substantially lesser length than the rail elements 12', to facilitate retrofitting of the inserts 50 into conventional guard rail systems. In the preferred embodiment, the heads 30 of the connectors 22 for connecting the insert 50 with the rail elements 12', would be oriented with respect to the insert 50 as indicated in FIG. 7.

OPERATION

A guard rail system 10 according to the present invention is constructed along side of a highway so that the rail elements 12 extend generally horizontally and substantially parallel to the direction of vehicular traffic along the highway. A rail end 14 is provided on the upstream and/or downstream side of the rail elements 12.

The four posts 16 located closest to the rail end 14 are mounted by means 18 to allow breakaway thereof upon an axial impact A on the rail end 14, but so that they will not fail upon an impact in other directions. A first I-beam section 38 is mounted in the ground, stabilized by the guard rail sections 112, and it is attached by a pair of channel members 42 to above ground I-beam section 39. Guard rail sections 12 are attached by frangible bolts 35 to extensions 36 of the upper I-beam section 39, and the rail elements 12 are overlapped by disposing the rail element, of a pair of overlapping rail elements 12, that is closer to the rail end 14 on top. Bolts 22 are passed through openings 24 in the top element 12, and corresponding conventional circular bores in the bottom element 12, with the ends 29 of each tang 26 disposed between the bolt head 30 and the washer 32.

Upon the application of an axial impact A on the rail end 14, each rail element 12 will be axially displaced with respect to its adjacent rail elements 12 about six inches to one foot, with the tangs 26 tearing (see dotted line configuraton of FIG. 3), the lateral displacement being arrested once the tangs 26 are displaced in their root portions 27, at which point the bolts 22 will be laterally displaced and ejected. During this relative movement between the rail elements 12, the rail elements 12 will be broken away from connection to the extensions 36 of the post 16 since the frangible bolts 35 will break. This axial movement of the guard rail elements 12 prevents spearing, vaulting, or rolling of the vehicle impacting the system 10. Every post 16 the vehicle impacts (which impact will not occur for a given post 16 until the bolts 35 associated therewith have broken away) will also break away. The cumulative effect of the energy absorbed both in the telescoping of the rail elements 12 and their breakaway from the post 16, and the breakaway of the posts 16 themselves, will result in significant energy absorption.

Should a vehicle impact upon the system 10 in a direction other than direction A (±20—see FIG. 6) no breakaway of the bolts 35 will occur, no breakaway of the posts 16 will occur, and no significant lateral displacement of the rail elements 12 will occur, thus the system 10 will maintain its normal redirecting characteristics.

The action during failure of the FIG. 7 embodiment would be the same as for the FIG. 1 embodiment. However, in the FIG. 7 embodiment conventional rail elements 12' would be utilized, with an insert 50 provided as every other element. The insert 50 would be connected up to the rail elements 12' at both ends thereof by connectors 22 passing through the openings 24, 52. The inserts 50 facilitate ready retrofitting of pre-existing guard rail systems.

While the invention has been herein shown and described in what is presently conceived to be the most practical and preferred embodiments thereof, it will be apparent to those of ordinary skill in the art that many modifications may be made thereof, within the scope of the invention, which scope is to be accorded the broadest interpretation of the appended claims so as to encompass all equivalent structures and assemblies.

What is claimed is:

1. A guard rail system comprising
   a plurality of rail elements having characteristics for re-directing impacting vehicles;
   a curved rail end mounted to one of said rail elements and forming a termination of said plurality of rail elements;
   a plurality of vertical posts for supporting said rail elements in a substantially horizontal position;
   means for mounting at least the post closest to said rail end so that said post will break away upon an axial impact of said rail end but will not fail upon an impact in other directions;
   means for attaching said rail elements to each other in overlapping relationship so that said rail elements will move axially with respect to each other upon an axial impact, but will maintain full tensile strength for maintaining their redirectional characteristics upon other than axial impacts, said means comprising first bolt means and surface means of said rail elements for receiving said first bolt means so that upon axial impact said connecting means will be laterally displaced and ejected; and
   second bolt means for attaching said rail elements to said posts.

2. A system as recited in claim 1 wherein said rail elements extend from said rail end in the direction of travel of vehicles along a highway with which said system is associated, and wherein said overlapping of said rail elements is accomplished by disposing the rail element closer to said rail end of overlapping rail elements on top.

3. A system as recited in claim 1 wherein said surface means of said rail elements for receiving said first bolt means comprise, for each bolt, a bolt-receiving opening, and a tang of said rail element having a root portion located closer to said rail end than said opening, and extending from said root portion to said bolt opening.

4. A system as recited in claim 1 wherein said rail elements are W-beams.

5. A system as recited in claim 1 wherein said second bolt means comprise a plurality of frangible bolts for connecting said rail elements to said posts so that said rail elements will break away from said posts upon an axial impact on said rail end, but will not break away upon other than axial impacts.

6. A system as recited in claim 1 wherein said means for mounting at least the post closest to said rail end so that it will break away upon axial impact comprises means for mounting the four posts nearest said rail end so that they will break away upon axial impact of said rail end but will not fail upon impact in other directions.

7. A system as recited in claim 1 wherein at least some of said posts comprise a first metal section disposed in the ground and a second metal section detached from said first metal section and disposed above ground, and further comprising coupling means for mounting said first and second sections together so that said coupling means will fail upon an axial impact but not upon impacts in other directions.

8. A system as recited in claim 7 further comprising W-beam guard rail sections mounted to each said first metal sections and disposed underground to stabilize said first metal sections.

9. A system as recited in claim 7 wherein said coupling means comprises a channel member including a central face and two opposite side portions extending generally perpendicular to said central face; means defining at least one linear groove in at least one of said central face and said side portions, said groove having an axis generally parallel to said side portions; means defining a transverse through-extending opening in said central face adjacent at least one end of said groove and providing substantially an end termination thereof; and means for receipt of a fastening component formed in said central face on each side of a plane passing through said opening perpendicular to said central face; and
   wherein said system further comprises a fastening component passing through each said means for receipt of a fastening component, for attaching said channel to both said post first and second sections.

10. A system as recited in claim 9 wherein both said post first and second sections are I-beams having opposed open channel-shaped portions, and wherein one of said channel members is disposed in each of said open channel-shaped portions.

11. A guard rail system comprising
a plurality of W-beam rail elements;
a curved rail end mounted to one of the rail elements and forming a termination of said plurality of rail elements;
a plurality of vertical posts for supporting said rail elements in a substantially horizontal position;
means for attaching said rail elements to each other in overlapping relationship with the rail element closer to said rail end of overlapping rail elements on top, so that said rail elements will move axially with respect to each other upon an axial impact, but will maintain full tensile strength upon other than axial impacts; and
second volt means, including a plurality of frangible bolts, for connecting said rail elements to said posts so that said rail elements will break away from said posts upon an axial impact on said rail end, but will not break away upon other than axial impacts.

12. A system as recited in claim 11 further comprising means for mounting a plurality of said posts closest to said rail end so that said posts will break away upon an axial impact of said rail end but will not fail upon an impact in other than said axial direction, ± about 20°.

13. A system as recited in claim 12 wherein said means for attaching said rail elements to each other in overlapping relationship comprises first bolt means and surface means of said rail elements for receiving said first bolt means, said surface means comprising, for each bolt, a bolt-receiving opening and a tang of said rail element having a root portion located closer to said rail element and than end opening, and extending from said root portion to said bolt opening.

14. A system as recited in claims 3 or 13 wherein every other rail element of said plurality of rail elements comprises a rail element having said surface means formed on both ends thereof, with said surface means on the end thereof closer to said curved rail end and including, for each bolt, a bolt receiving opening, and a tang of said rail element having a root portion located farther from sad curved rail end than said opening, and extending from said root portion to said opening.

15. A guard rail system comprising:
a plurality of rail elements having characteristics for re-directing impacting vehicles and disposed in a series;
a curved rail end mounted to one of said rail elements and forming a termination of said plurality of rail elements;
a plurality of vertical posts for supporting said rail elements in a substantially horizontal position;
means for attaching at least some of said rail elements to said posts; and
every other rail element of said plurality of rail elements comprising means for attaching rail elements on either side thereof to each other so that said rail elements will move axially with respect to each other upon an axial impact, but will maintain full tensile strength for maintaining their redirectional characteristics upon other than axial impacts, and said attaching means further comprising connecting means, and surface means formed on both ends of each said every other rail element for receiving and ejecting said connecting means.

16. A system as recited in claim 15 wherein each said every other rail element is substantially shorter than the rest of said rail elements, comprising an insert; and wherein said every other rail elements are unconnected to said posts.

17. A system as recited in claim 16 wherein said surface means comprise, for each connector of said connecting means, a connector receiving opening, and a tang of said rail element having a root portion spaced from said opening and extending from said root portion to said opening.

18. A system as recited in claim 17 wherein each said every other rail element has two ends, first end located closer to said curved rail end, and a second end located further from said curved rail end; and wherein each root portion of each tang associated with said surface means formed in said second end is located closer to its respective opening than its respective opening is to said curved rail end.

19. A guard rail element comprising a W-beam having first and second ends, and surface means formed in at least one of said first and second ends;
said surface means comprising a plurality of openings, each adapted to receive a connector therein, and a tang associated with each opening;
each tang comprising a root portion spaced from said opening, and extending from said root portion to said opening.

20. A guard rail element as recited in claim 19 wherein each said root portion is located closer to the middle of said rail element than is the opening with which it is associated.

21. A guard rail element as recited in claim 20 wherein surface means are formed in both said first and second ends.

22. A guard rail element as recited in claim 20 wherein said surface means are formed in said first end, and said second end has formed therein a plurality of openings for receipt of connectors.

23. A guard rail system comprising
a plurality of rail elements having characteristics for re-directing impacting vehicles;
a curved rail end mounted to one of said rail elements and forming a termination of said plurality of rail elements;
a plurality of vertical posts for supporting said rail elements in a substantially horizontal position;
means for mounting at least the post closest to said rail end so that said post will break away upon an axial impact of said rail end but will not fail upon an impact in other directions;
means for attaching said rail elements to each other in overlapping relationship so that said rail elements will move axially with respect to each other upon an axial impact, but will maintain full tensile strength for maintaining their redirectional characteristics upon other than axial impacts, said means comprising first bolt means and surface means of said rail elements for receiving said first bolt means; and
second bolt means for attaching said rail elements to said posts comprising a plurality of frangible bolts for connecting said rail elements to said posts so that said rail elements will break away from said posts upon an axial impact on said rail end, but will not break away upon other than axial impacts.

24. A system as recited in claim 15 wherein said attaching means first bolt means and surface means attach said rail elements to each other so that upon axial impact said connecting means will be laterally displaced and ejected.

25. A system as recited in claims 16 or 24 wherein said rail elements are W-beams.

26. A guard rail system comprising
a plurality of rail elements having characteristics for re-directing impacting vehicles;
a curved rail end mounted to one of said rail elements and forming a termination of said plurality of rail elements;
a plurality of vertical posts for supporting said rail elements in a substantially horizontal position at least some of said posts comprise a first metal section disposed in the ground and a second metal section detached from said first metal section and disposed above ground, and W-beam guard rail sections mounted to each said first metal sections and disposed underground to stabilize said first metal sections;
means for mounting at least the post closest to said rail end so that said post will break away upon an axial impact of said rail end but will not fail upon an impact in other directions, said means comprising coupling means for mounting said first and second sections together so that said coupling means will fail upon an axial impact but not upon impacts in other directions;
means for attaching said rail elements to each other in overlapping relationship so that said rail elements can move axially with respect to each other upon an axial impact, but will maintain their re-directional characteristics upon other than axial impacts; and
second bolt means for attaching said rail elements to said posts.

27. A guard rail system comprising
a plurality of rail elements having characteristics for re-directing impacting vehicles;
a curved rail end mounted to one of said rail elements and forming a termination of said plurality of rail elements;
a plurality of vertical posts for supporting said rail elements in a substantially horizontal position;
means for mounting at least the post closest to said rail end so that said post will break away upon an axial impact of said rail end but will not fail upon an impact in other directions;
means for attaching said rail elements to each other in overlapping relationship so that said rail elements will move axially with respect to each other upon an axial impact, but will maintain full tensile strength for maintaining their re-directional characteristics upon other than axial impacts, said means comprising first bolt means and surface means of said rail elements for receiving said first bolt means; said surface means of said rail elements for receiving said first bolt means comprise, for each bolt, a bolt-receiving opening, and a tang of said rail element having a root portion located closer to said rail end than said opening, and extending from said root portion to said bolt opening; and
second bolt means for attaching said rail elements to said posts.

28. A system as recited in claim 27 wherein each said tang is wider at its root portion than it is adjacent its respective bolt opening, gradually tapering from its root portion to its associated opening.

29. A system as recited in claim 27 wherein said first bolt means comprises a plurality of bolts each including a head and a washer, and wherein each tang is received between a bolt head and washer on the face of each guard rail element most remote from said vertical posts.

* * * * *